Patented Jan. 10, 1928.

1,655,863

UNITED STATES PATENT OFFICE.

IVAN GUBELMANN, OF SOUTH MILWAUKEE, WISCONSIN, ASSIGNOR TO THE NEWPORT COMPANY, OF CARROLLVILLE, WISCONSIN, A CORPORATION OF DELAWARE.

PROCESS OF PREPARING 2-(OR 3-) CHLORO-QUINIZARINE.

No Drawing.   Application filed November 2, 1925. Serial No. 66,426.

This invention relates to a method of preparing 2-(or 3-) chloro-quinizarine, more specifically referred to as 1.4-dihydroxy-2-chloro or 3-chloro-anthraquinone.

I have discovered that 3,4-dichlorophenol may be condensed with phthalic anhydride in the presence of concentrated or fuming sulphuric acid and boric acid. The first reaction taking place is the formation of 2-hydroxy-4,5 dichloro-o-benzoyl-benzoic acid, according to the following equation:

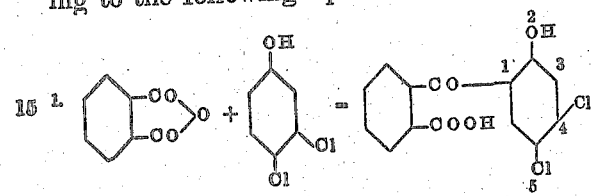

The reaction proceeds according to this equation particularly with temperatures below 200° C. and when sulfuric acid below 100% is used. At about 200° C. using sulfuric acid of 100% strength or fuming sulfuric acid, ring closing to an anthraquinone derivative takes place and 1 molecule of hydrochloric acid is eliminated and replaced by a hydroxyl group, the end product being 2-(or 3-)-chloro-1,4-dihydroxyanthraquinone. The reaction proceeds evidently according to the following equations:

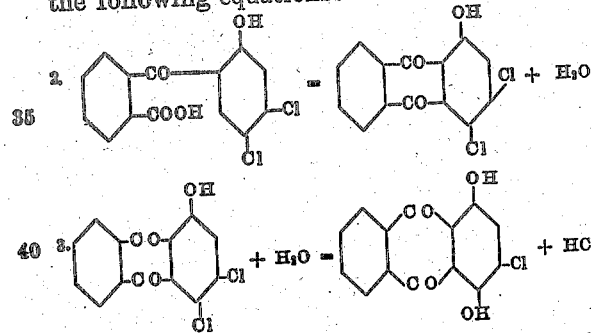

The reactions as indicated by equations (2) and (3) seem to be simultaneous, which is in accordance with the well known fact that halogen atoms are not easily removed in benzene derivatives, whereas in anthraquinone derivatives they become very mobile. It is evident that since the structural formula for the end product is symmetrical about a horizontal axis except for the chlorine atom, the product may be called either 2- or 3- chloro-1,4-dihydroxyanthraquinone, the two names being in fact for the same chemical compound.

The 2-(or 3-) chloro-1,4-dihydroxyanthraquinone thus obtained is an orange-colored powder having a melting point of 235–236° C. It is practically insoluble in water and dilute acids, slightly soluble in alcohol, fairly soluble in benzol and toluol, and readily soluble in aniline and its homologues. It dissolves in 96% sulfuric acid giving a solution having a bright orange-red color, and in 2% caustic soda solution giving a bright purple solution which becomes slightly bluer on further dilution.

While I do not desire to limit my invention to any particular procedure, the following examples, in which parts by weight are given, will serve to illustrate my preferred methods:

*Example I.*—50 parts of 3,4-dichlorophenol, having a melting point of 64° C., is added to 950 parts of 100% sulfuric acid together with 55 parts of boric acid and 150 parts of phthalic anhydride. The reaction mixture is well agitated and the temperature is gradually raised to 195–200° C., where it is kept for 4 hours. The mixture gradually assumes a bright red color, which becomes more intense as the reaction proceeds. After 4 hours of heating, no appreciable increase in the intensity of the color should be apparent and the reaction is then regarded as finished. The mass is now cooled to 100° C. and gradually poured into 19000 parts of cold water. The product of the reaction, which is thereby precipitated, is filtered off and the filter cake thus obtained is boiled up in 3000 parts of water containing 5 parts of 20° Bé. hydrochloric acid for about ½ hour. The precipitate is again filtered, washed free of acid, and dried in a suitable drier, preferably under vacuum.

After pulverizing, the finished product is obtained as a bright orange colored powder, having a melting point of 234–235° C. and a chlorine content corresponding closely with the theoretical amount contained in 2-(or 3-)-chloro-1,4-dihydroxyanthraquinone, namely 2-(or 3-) chloro quinizarine. The product may be recrystallized from benzol if a very pure product is desired. After recrystallization, the melting point will have increased to 235-236° C. However, for use in manufacturing dyestuffs, the crude product is sufficiently pure.

*Example II.*—10 parts of 3,4-dichlorophenol having a melting point of 64° C. is added to 180 parts sulfuric acid containing 5% free sulfuric acid anhydride, together with 30 parts of phthalic acid anhydride and 11 parts of boric acid. The mixture is well agitated and the temperature gradually raised to 200° C. The reaction mixture gradually assumes a bright red color which becomes more intense as the reaction proceeds. After 3½ hours of heating, no appreciable increase in the intensity of the color is apparent and the reaction is then regarded as finished. The mass is then cooled to 50° C. and gradually poured into 3600 parts of cold water. The 2-chloro- or 3-chloro-1,4 dihydroxy anthraquinone 2-(or 3-) chloroquinizarine is thereby precipitated. It is filtered off and the filter cake further treated in a similar way as given in Example I.

I am aware that numerous details of the process may be varied through a wide range without departing from the spirit of this invention, and I do not desire limiting the patent granted hereon other than necessitated by the prior art.

I claim as my invention:

1. The process of preparing 2-(or 3-) chloro-quinizarine by condensing 3,4-dichlorophenol with phthalic anhydride in the presence of concentrated sulfuric acid and boric acid.

2. The process of preparing 2-(or 3-) chloro-quinizarine by condensing 3,4-dichlorophenol with phthalic anhydride in the presence of sulfuric acid containing free sulfuric anhydride and boric acid.

3. The process of preparing 2-(or 3-) chloro-quinizarine, which comprises condensing 3,4-dichlorophenol with phthalic anhydride in the presence of concentrated sulfuric acid and boric acid and hydrolyzing the condensation product so formed without isolating the same from the condensation mass to obtain chloro-quinizarine directly in a high state of purity.

4. The process of preparing 2-(or 3-) chloro-quinizarine, which comprises condensing 3,4-dichlorophenol with phthalic anhydride in the presence of concentrated sulfuric acid and boric acid at approximately 200° C. for 3½ to 4 hours, cooling the condensation mass and pouring the same into a relatively large quantity of water, whereby a precipitation of chloro-quinizarine occurs.

In testimony whereof I have hereunto subscribed my name.

IVAN GUBELMANN.